(12) United States Patent
Oak et al.

(10) Patent No.: US 11,147,107 B2
(45) Date of Patent: Oct. 12, 2021

(54) METHOD AND DEVICE FOR COMMUNICATION BETWEEN NETWORK ENTITIES IN CLOUD LAN ENVIRONMENT

(71) Applicant: Samsung Electronics Co., Ltd., Suwon-si (KR)

(72) Inventors: Jeongyeob Oak, Suwon-si (KR); Sejin Park, Suwon-si (KR); Jisoo Song, Suwon-si (KR); Wonil Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 16/611,346

(22) PCT Filed: Dec. 15, 2017

(86) PCT No.: PCT/KR2017/014877
§ 371 (c)(1),
(2) Date: Nov. 6, 2019

(87) PCT Pub. No.: WO2018/207987
PCT Pub. Date: Nov. 15, 2018

(65) Prior Publication Data
US 2020/0084808 A1    Mar. 12, 2020

(30) Foreign Application Priority Data
May 12, 2017    (KR) .......................... 10-2017-0059624

(51) Int. Cl.
*H04W 76/10*       (2018.01)
*H04L 29/08*       (2006.01)
(Continued)

(52) U.S. Cl.
CPC ............. *H04W 76/10* (2018.02); *H04L 67/10* (2013.01); *H04W 72/04* (2013.01); *H04W 80/02* (2013.01)

(58) Field of Classification Search
CPC ..... H04W 76/10; H04W 72/04; H04W 80/02; H04L 67/10
See application file for complete search history.

(56) References Cited

U.S. PATENT DOCUMENTS

2013/0322293 A1*  12/2013  Kang .................... H04W 92/20
                                                        370/254
2014/0087750 A1*  3/2014  Taori .................... H04W 24/02
                                                        455/452.2
(Continued)

OTHER PUBLICATIONS

Ericsson, 'TP on Network deployment based on option 2', R3-170684, 3GPP TSG-RAN WG3 Meeting #95, Feb. 6, 2017.
(Continued)

*Primary Examiner* — Jael M Ulysse
(74) *Attorney, Agent, or Firm* — Jefferson IP Law, LLP

(57) ABSTRACT

The present disclosure relates to a research that has been conducted with the support of the "Cross-Depaitmental Giga KOREA Project" funded by the government (the Ministry of Science and ICT) in 2017 (No. GK17N0100, millimeter wave 5G mobile communication system development). The present disclosure relates to a communication technique for convergence of a 5G communication system for supporting a higher data transmission rate beyond a 4G system with an IoT technology, and a system therefor. The present disclosure may be applied to an intelligent service (for example, smart home, smart building, smart city, smart car or connected car, health care, digital education, retail business, security and safety-related service, etc.) on the basis of a 5G communication technology and an IoT-related technology.

16 Claims, 26 Drawing Sheets

(51) Int. Cl.
  *H04W 72/04*  (2009.01)
  *H04W 80/02*  (2009.01)

(56) References Cited

U.S. PATENT DOCUMENTS

| | | | |
|---|---|---|---|
| 2014/0226481 A1* | 8/2014 | Dahod | H04W 36/0055 370/235 |
| 2014/0321419 A1* | 10/2014 | Kwon | H04L 5/0005 370/330 |
| 2015/0372728 A1* | 12/2015 | Rahman | H04B 7/0456 370/329 |
| 2016/0345204 A1* | 11/2016 | Godin | H04W 36/0069 |
| 2017/0373731 A1* | 12/2017 | Guo | H04W 72/046 |
| 2018/0034515 A1* | 2/2018 | Guo | H04B 7/043 |
| 2018/0376380 A1* | 12/2018 | Leroux | H04W 76/18 |

OTHER PUBLICATIONS

Nokia, 'TP of Clean up for functional split', R3-170416, 3GPP TSG-RAN WG3 Meeting #95, Feb. 6, 2017.
SK Telecom, 'Considerations on function split for 5G deployment', R3-171864, 3GPP TSG-RAN3 Meeting #96, Hangzhou, P. R. China, May 6, 2017.
Nokia, 'General description of gNB-CU/DU split in TS 38.300', R3-171431, 3GPP TSG-RAN3 Meeting #96, Hangzhou, P. R. China, May 5, 2017.

* cited by examiner

FIG. 15

| Bits | | | | | | | | Number of Octets |
|---|---|---|---|---|---|---|---|---|
| 7 | 6 | 5 | 4 | 3 | 2 | 1 | 0 | |
| PDU Type (=8) | | | | Req. Flag | Spare | | | 1 |
| X2-U Sequence Number | | | | | | | | 3 |
| Spare extension | | | | | | | | 0-4 |

FIG. 16

| Bits | | | | | | | | Number of Octets |
|---|---|---|---|---|---|---|---|---|
| 7 | 6 | 5 | 4 | 3 | 2 | 1 | 0 | |
| PDU Type (=9) | | | | Spare | | Final Frame Ind. | Lost Packet Report | 1 |
| Highest successfully delivered PDCP Sequence Number | | | | | | | | 3 |
| Desired buffer size for the E-RAB | | | | | | | | 4 |
| Minimum desired buffer size for the UE | | | | | | | | 4 |
| Number of lost X2-U Sequence Number ranges reported | | | | | | | | 1 |
| Start of lost X2-U Sequence Number range | | | | | | | | 6∗ (Number of reported lost X2-u SN ranges) |
| End of lost X2-U Sequence Number range | | | | | | | | |
| Spare extension | | | | | | | | 0-7 |

FIG. 17

| Bits | | | | | | | | Number of Octets |
|---|---|---|---|---|---|---|---|---|
| 7 | 6 | 5 | 4 | 3 | 2 | 1 | 0 | |
| PDU Type (=10) | | | | Req. Flag | Priority | | RTT | 1 |
| X2-U Sequence Number | | | | | | | | 3 |
| Sender Timestamp | | | | | | | | 4 |
| Spare extension | | | | | | | | 0-4 |

FIG. 18

| Bits | | | | | | | | Number of Octets |
|---|---|---|---|---|---|---|---|---|
| 7 | 6 | 5 | 4 | 3 | 2 | 1 | 0 | |
| PDU Type (=11) | | | | RTT | Credit Ind. | Final Frame Ind. | Lost Packet Report | 1 |
| Sender Timestamp | | | | | | | | 4 |
| Receiver Timestamp | | | | | | | | 4 |
| Desired buffer size for the E-RAB | | | | | | | | 4 |
| Minimum desired buffer size for the UE | | | | | | | | 4 |
| Number of lost X2-U Sequence Number ranges reported | | | | | | | | 1 |
| Start of lost X2-U Sequence Number range | | | | | | | | 6· (Number of reported lost X2-u SN ranges) |
| End of lost X2-U Sequence Number range | | | | | | | | |
| Spare extension | | | | | | | | 0-7 |

METHOD AND DEVICE FOR COMMUNICATION BETWEEN NETWORK ENTITIES IN CLOUD LAN ENVIRONMENT

TECHNICAL FIELD

The disclosure relates to a communication method between network entities in a cloud LAN environment according to a next generation communication system, and more particularly, to a communication process through a fronthaul interface between network entities in a 5G or pre-5G communication system.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, technologies such as a sensor network, Machine to Machine (M2M), and Machine Type Communication (MTC) are implemented by beamforming, MIMO, and array antenna schemes. The application of a cloud RAN as the big data processing technology may be an example of convergence of the 5G technology and the IoT technology.

The disclosure relates to research that has been conducted with the support of the "Cross-Departmental Giga KOREA Project" funded by the government (the Ministry of Science and ICT) in 2017 (No. GK17N0100, millimeter wave 5G mobile communication system development).

DISCLOSURE OF INVENTION

Technical Problem

An embodiment has been proposed to solve the above-described problem, and the proposed embodiment aims to efficiently perform communication through a fronthaul interface between network entities.

Another embodiment aims to smoothly set up an interface even among network entities supporting different methods.

Another embodiment aims to perform communication optimized for a network situation and an operation policy by dynamically selecting a function split scheme to set up a fronthaul interface.

Technical tasks to be achieved in the disclosure are not limited to the above-mentioned matters, and other technical problems that are not mentioned above are provided to those skilled in the art from the embodiments to be described below.

Solution to Problem

Also, a second communication node according to an embodiment includes: a transceiver configured to transmit and receive a signal; and a controller configured to receive, from a first communication node, a message including information for configuring a fronthaul interface with the first communication node and to perform communication with the first communication node through the configured fronthaul interface according to the message.

Advantageous Effects of Invention

According to the embodiments, the following effects can be expected.

First, a communication process through a fronthaul interface between network entities can be performed smoothly.

Second, the setup and communication of an interface can be reliably performed even between network entities of vendors that support different function split schemes.

Third, optimized communication can be performed according to network conditions and service requirements by dynamically selecting different function split schemes to configure an interface.

Effects of the disclosure are not limited to those mentioned herein, and other effects which are not mentioned herein will be clearly understood by those of ordinary skill in the art. In other words, unintended effects of practicing the disclosure may also be derived by those skilled in the art from the embodiments.

BRIEF DESCRIPTION OF DRAWINGS

The accompanying drawings are provided to help understand the disclosure, and provide embodiments with the detailed description. However, the technical features of the disclosure are not limited to the specific drawings, and the features disclosed in the drawings may be combined with each other to constitute a new embodiment. Reference numerals in each drawing refer to structural elements.

FIG. 15 is a diagram illustrating an example of a data structure that can be used in a communication process according to an embodiment.

FIG. 16 is a diagram illustrating an example of a data structure that can be used in a communication process according to another embodiment.

FIG. 17 is a diagram illustrating an example of a data structure that can be used in a communication process according to another embodiment.

FIG. 18 is a diagram illustrating an example of a data structure that can be used in a communication process according to another embodiment.

MODE FOR THE INVENTION

Figure 1:
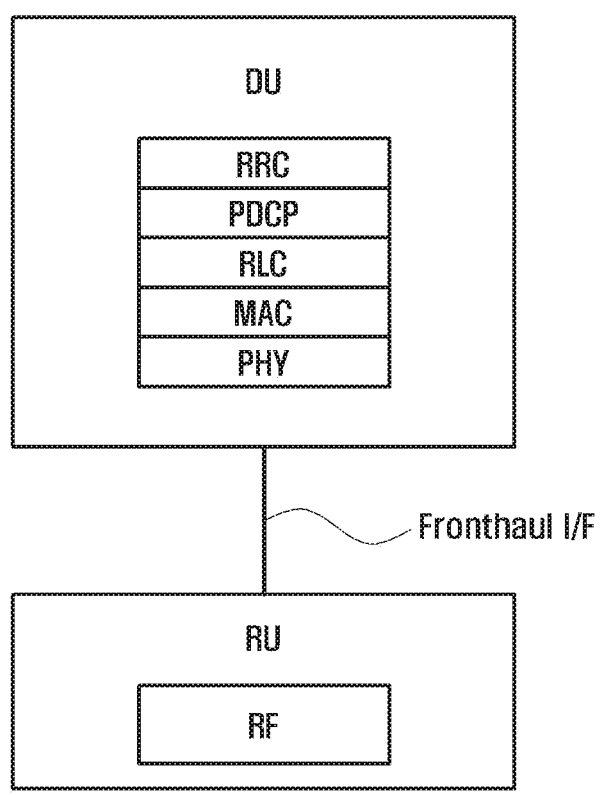
FIG. 1 illustrates a structure of a fronthaul interface in a C-RAN environment

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

FIG. 1 illustrates a fronthaul interface structure in a C-RAN environment according to a conventional communication system.

In a centralized/cloud-RAN (C-RAN) in an LTE/LTE-A communication system, which is referred to as a conventional 4G communication system, a structure split into a digital unit (DU) and a radio unit (RU) has been considered, as shown in FIG. 1. In this structure, PDCP, RRC, RLC, MAC, and PHY functions have been implemented in the DU, and only an RF function has been implemented in the RU so that they operate in conjunction with each other. Meanwhile, an interface between the DU and the RU has been called a fronthaul interface so that the interface can be compared with the concept of a backhaul of a core network (CN).

Figure 2A:
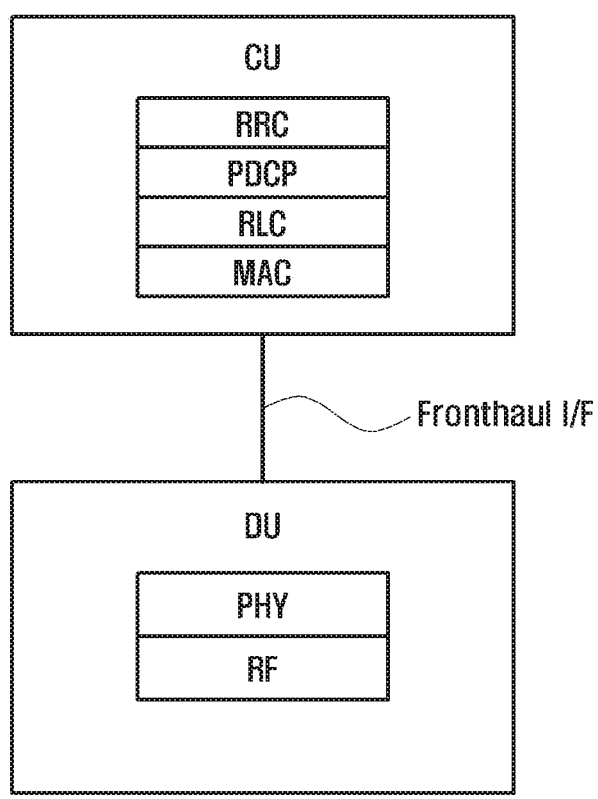
FIGS. 2A and 2B illustrate setup examples of a fronthaul interface according to an embodiment.
Figure 2B:
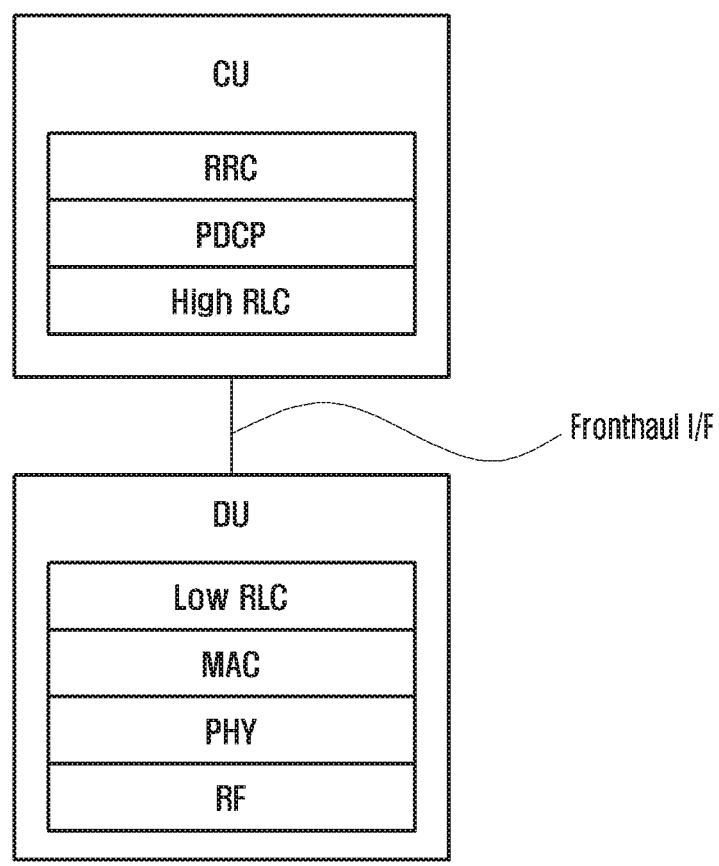

FIGS. 2A and 2B illustrate setup examples of a fronthaul interface according to an embodiment. The setup examples shown in FIGS. 2A and 2B illustrate interfaces between network entities of a virtualized RAN (vRAN) or cloud LAN as discussed in a 5G communication system developed from a 4G communication system, where the vRAN or cloud LAN is composed of a central unit (CU) and a distributed unit (DU) split from each other or an access unit (AU). The fronthaul interface is implemented among the CU, the DU, and the AU as defined by each vendor. In particular, FIG. 2B illustrates the setup example of the fronthaul interface according to a function split Option 3-1 to be described later.

Meanwhile, the fronthaul interface between the CU and the DU is distinguished from a Uu interface of a legacy communication system. Specifically, the Uu interface of the legacy communication system is an interface between a UE and an eNB, and it is assumed that all the functions of RRC, PDCP, RLC, MAC, and PHY layers are implemented and operated in the eNB. On the other hand, in the fronthaul interface according to an embodiment, the eNB is split into the CU and the DU and implemented, and the respective layers are split and implemented in the CU and the DU. This is because, in the next-generation communication system such as 5G or pre-5G, the amount of data processing required in a wireless communication process is explosively increased, which leads to a limitation in the conventional method.

According to an embodiment, as a solution to the above-mentioned problem, respective layers constituting a protocol stack are split into the CU and the DU, and a fronthaul interface is set up between the CU and DU. This CU-DU split configuration is called a function split scheme, and as shown in FIG. 3, two schemes may be considered as examples.

Description will be made with reference to FIG. 3 as an example. A function split 31 of an embodiment shown on the left side of FIG. 3 is hereinafter referred to as "Option 2". According to the embodiment of the function split 31 of Option 2, an RRC layer and a PDCP layer are implemented and operated in a CU, and an RLC layer, an MAC layer, a PHY layer, and an RF function are implemented and operated in a DU. According to the embodiment of Option 2, the CU performs functions corresponding to the RRC layer and the PDCP layer, and the DU performs functions corresponding to the other layers.

Figure 3:
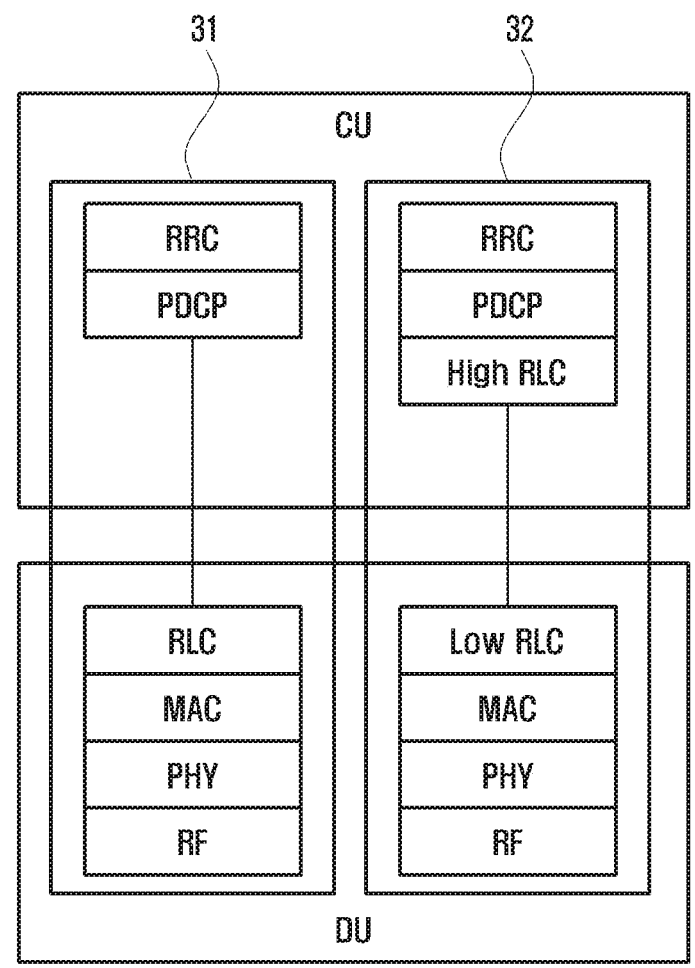
FIG. 3 illustrates a setup example of a fronthaul interface according to another embodiment.

A function split 32 of an embodiment shown on the right side of FIG. 3 is referred to as "Option 3-1" below. According to the embodiment of the function split 32 of Option 3-1, some functions of the RLC layer in addition to the RRC layer and the PDCP layer are implemented and operated in the CU, and the remaining functions of the RLC layer other than the functions of the RLC layer implemented in the CU, functions of the MAC layer and the PHY layer, and an RF layer are implemented and operated in the DU. According to the embodiment of Option 3-1, the CU transmits, to the DU data processed according to some functions (e.g., packet segmentation/concatenation) of the RLC layer via the PDCP layer, and the DU performs the remaining functions of the RLC layer, the functions of the MAC and PHY layers, and the RF function with respect to data received from the CU.

Meanwhile, as described above, the function split may be performed differently as defined by an RAN vendor, and therefore there is a difficulty in configuring a connection relationship between the CU and the DU because the fronthaul interface is not unified among different RAN vendors.

For example, when function split is performed in different ways for each vendor, such as in Option 2 and Option 3-1, the fronthaul interface (or F1 interface) is not unified, and therefore it is difficult to support CU-DU matching between multiple vendors. Accordingly, hereinafter, a method for enabling CU-DU matching even when function split is performed in different ways will be described.

Hereinafter, for convenience of description, Option 2 and Option 3-1 described with reference to FIG. 3 will be described as examples. However, the proposed embodiment is not limited to these examples and can be extended and applied to other function split schemes.

Before describing the proposed embodiments, the function of each layer to be used throughout the proposed embodiment will be briefly described. A fronthaul interface between a CU and a DU is composed of a radio resource control (RRC) layer, a packet data convergence protocol (PDCP) layer, a radio link control (RLC) layer, a medium access control (MAC) layer, a physical (PHY) layer, and a radio frequency (RF) layer. The PDCP layer is responsible for operations such as IP header compression/restoration, and the RLC layer reconfigures a PDCP packet data unit (PDU) to an appropriate size. The MAC layer is connected to several RLC layers and performs an operation of multiplexing RLC PDUs to an MAC PDU and demultiplexing the RLC PDUs from the MAC PDU. The PHY layer performs channel coding and modulation on higher layer data, converts the obtained data into an OFDM symbol, and transmits the OFDM symbol via a wireless channel. Alternatively, the PHY layer demodulates the OFDM symbol received via the wireless channel, performs channel decoding on the demodulated OFDM symbol, and transmits the obtained data to a higher layer. In addition, the PHY layer uses a hybrid ARQ (HARQ) for error correction together with the MAC layer, and a reception end transmits information indicating whether a packet transmitted by a transmission end is received as 1 bit. This is called HARQ ACK/NACK information. Meanwhile, the RRC layer is defined only in a control plane, and the RRC layer is in charge of controlling other channels related to the setup, reconfiguration, and release of radio bearers.

First, a configuration of each of a control plane and a user plane is described according to the proposed embodiments, and then a detailed operation process of the control plane and the user plane will be described with the drawings.

According to an embodiment, a control plane for supporting both function splits according to Option 2 and Option 3-1 is defined based on a protocol standard defined in 3GPP TS 36.423 E-UTRAN X2-AP, and can operate according to a procedure to be described below.

First, the control plane according to an embodiment supports an initializing procedure of a fronthaul interface between the CU and the DU or an operation procedure including the above-described initializing procedure. The initializing procedure of the fronthaul interface may include an operation of exchanging data required for setting up the fronthaul interface in the CU and the DU, and a management operation for the DU of the CU.

In addition, the control plane according to an embodiment supports a common signaling procedure of the fronthaul interface between the CU and the DU. The common signaling procedure may include a control operation for transmitting and receiving RRC information to and from a UE through the fronthaul interface.

In addition, the control plane according to an embodiment supports a context exchange procedure of the fronthaul interface between the CU and the DU. The context exchange procedure may include an operation of exchanging and managing context information of a UE between the CU and the DU. Such an operation may be composed of an operation in which the CU sets up the MAC and PHY layers of the DU for each UE. This context exchange procedure may also include an inter-DU mobility procedure of the fronthaul interface between the CU and the DU.

In addition, the control plane according to an embodiment supports a paging procedure of the fronthaul interface between the CU and the DU. The paging procedure may include an operation of transmitting paging information on a scheduling parameter between the CU and the DU.

Meanwhile, in order for the fronthaul interface between the CU and the DU to support function split according to Option 2, an MAC parameter and a PHY parameter may be included in RRC configuration information for each bearer allocated to a UE. Similarly, in order for the fronthaul interface between the CU and the DU to support function split according to Option 3-1, an MAC parameter, a PHY parameter, and an RLC parameter may be included in RRC configuration information for each bearer allocated to a UE. According to an embodiment, in order for the fronthaul interface between the CU and the DU to support both Option 2 and Option 3-1, an RLC-related parameter may be defined as an optional field in RRC configuration information.

In addition, according to an embodiment, the fronthaul interface between the CU and the DU may use an SCTP protocol with respect to a control plane F1-C, and a GTP protocol may be used with respect to a user plane F1-U to be described below.

Following the configuration of the control plane described above, a configuration of a user plane according to the proposed embodiment will be described.

According to an embodiment, a user plane for supporting both function splits according to Option 2 and Option 3-1 is defined based on a protocol standard defined in 3GPP TS 36.425 E-UTRAN X2-UP, and is defined to extend the protocol standard so that the protocol standard can be applied to a tightly interworking LTE.

The user plane according to such an embodiment is based on GTP-U, and defines "RAN container" as an extension header of the GTP-U so that the header of the user plane is configured. Types of 0 to 3 are used as a PDU type defined in the existing X2-UP, whereas the PDU type is extended to types of 8 to 11 to be used in the user plane according to the proposed embodiment. An MSB value of this PDU type may be 1.

In the above, the configuration of the control plane and the configuration of the user plane according to the proposed embodiment have been described. Hereinafter, a specific operation process of the control plane and a specific operation process of the user plane will be described with reference to the drawings.

Meanwhile, each of the CU and the DU may be implemented as a separate eNB. Hereinafter, the term "network entity" may be used as a term for referring to each of a CU and a DU as well as a term for referring to a CU and a DU together. In addition, the "eNB" may also include a CU and a DU, and each unit (CU and DU) may perform an operation of the eNB. In addition, in the following embodiments, each unit may be referred to as an independent eNB.

However, in an embodiment, the configurations of the CU and DU may be somewhat different from each other. More specifically, a radio-related layer of the DU may be configured to be split into another node. In addition, the features of the disclosure can be applied to other modified configurations.

In addition, the CU may also include other layers or some layers thereof may be omitted. However, when an operation related to the PDCP layer is performed and a signal is transmitted or received to and from a node for performing the operation of the RLC layer, an embodiment related to the CU of the disclosure may be applied.

In addition, the DU may also include other layers or some layers thereof may be omitted. However, when an operation related to the RLC layer is performed and a signal is transmitted or received to and from a node for performing the operation of the PDCP layer, an embodiment related to the DU of the disclosure may be applied.

In addition, in terms of devices, nodes to which the above embodiment is applicable may be referred to as CUs or DUs.

Figure 4:
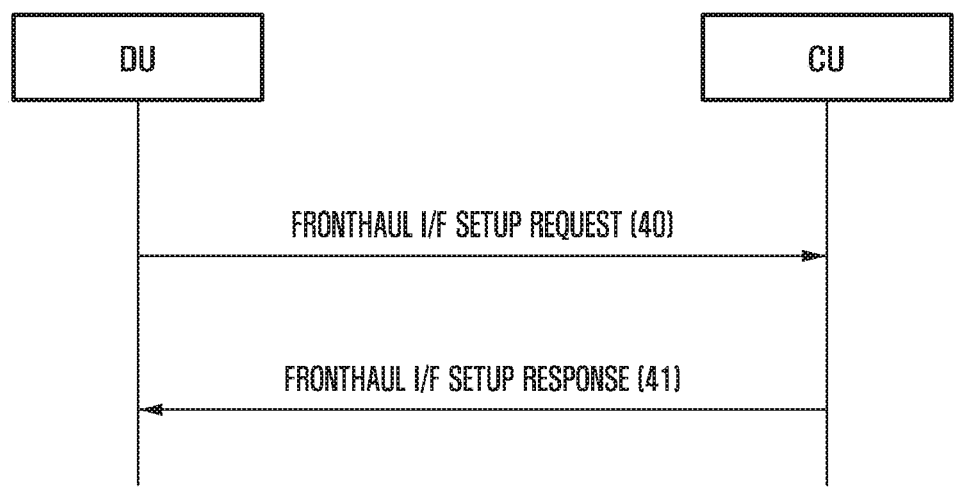
FIG. 4 is a diagram illustrating a communication process between network entities according to an embodiment.

First, a fronthaul interface-initializing procedure (or the operation procedure including the initializing procedure) during the operation of the control plane will be described with reference to FIG. 4. The fronthaul interface-initializing procedure is a process for initially setting up the fronthaul interface between the CU and the DU, and is performed by transmitting and receiving a fronthaul interface (I/F) SETUP REQUEST message 40 and a fronthaul I/F SETUP RESPONSE message 41. The DU transmits the fronthaul I/F SETUP REQUEST message 40 to the CU, and in response to this, the DU transmits the fronthaul I/F SETUP RESPONSE message 41 to the CU. Initialization information for setting up the fronthaul interface between the CU and the DU is exchanged through this procedure.

Specifically, the DU transmits the fronthaul I/F SETUP REQUEST message 40 to the CU by enabling information on a function split scheme to be operated by the DU to be included in the message 40. This function split information may include, for example, a value indicating whether the DU selects Option 2 or Option 3-1. The CU approves/rejects the function split scheme transmitted by the DU after receiving the fronthaul I/F SETUP REQUEST message 40, and transmits the fronthaul I/F SETUP RESPONSE message 41 to the DU by enabling information on the approval/rejection to be included in the message 41. If the CU approves the function split scheme requested by the DU, the fronthaul interface between the CU and the DU is set up. If the CU rejects the function split scheme requested by the DU, the fronthaul interface is not set up between the CU and the DU.

Meanwhile, unlike the above-described embodiment (initiated by the DU), the fronthaul interface-initializing procedure described with reference to FIG. 4 may also be started by the CU.

Figure 5A:
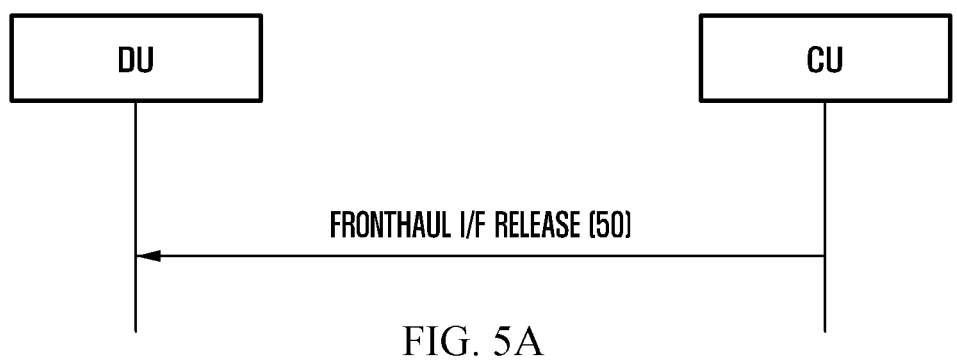
FIGS. 5A and 5B are diagrams illustrating a communication process between network entities according to another embodiment.
Figure 5B:
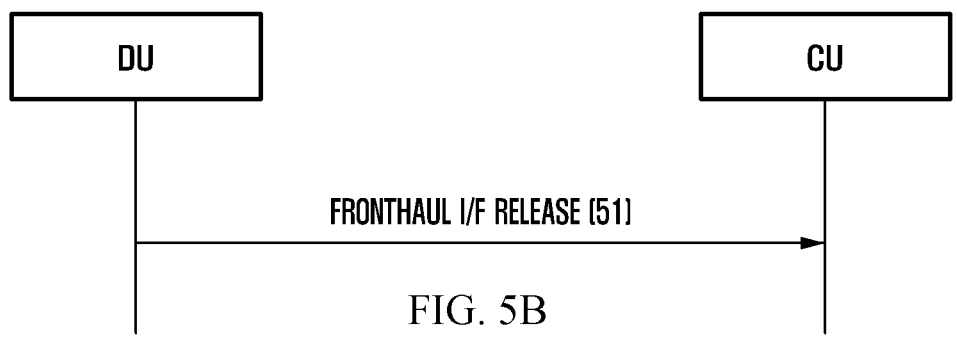

FIGS. 5A and 5B illustrate a process of disconnecting a fronthaul interface, as necessary, after the fronthaul interface between a CU and a DU is set up. FIG. 5A illustrates a process of requesting for disconnection of an interface by a CU. Here, the CU may release a preset interface by transmitting a fronthaul I/F RELEASE message 50 to the DU. On the contrary, FIG. 5B illustrates a process of requesting for disconnection of an interface by a DU, and the DU may release a preset interface by transmitting a fronthaul I/F RELEASE message 51 to the CU.

Figure 6:
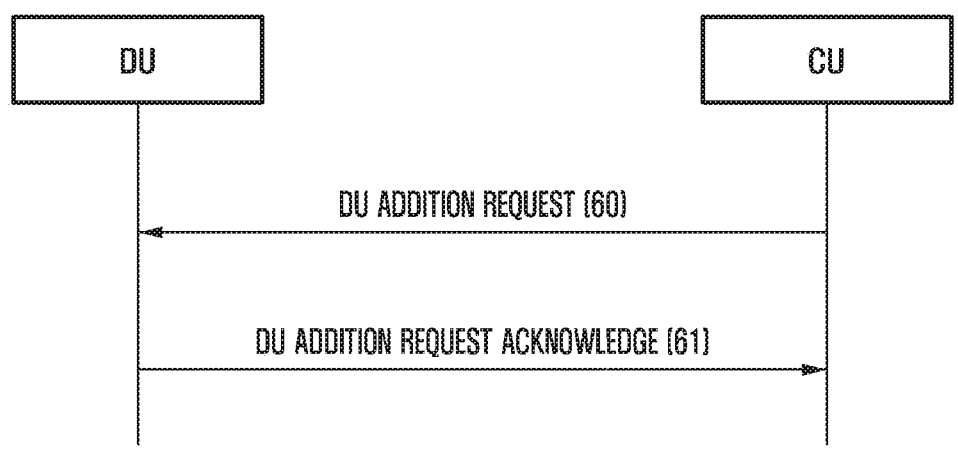
FIG. 6 is a diagram illustrating a communication process between network entities according to another embodiment.

FIG. 6 is a diagram illustrating a registration procedure between a CU and a DU after an interface between the CU and the DU is set up. The CU transmits a fronthaul I/F DU ADDITION REQUEST message 60 to the DU, and transmits a parameter for each layer to the DU along with information on a determined function split scheme. For example, if Option 2 is selected, the CU transmits an MAC/PHY parameter to the DU. If Option 3-1 is selected, the CU transmits an RLC parameter in addition to the MAC/PHY parameter information to the DU.

Next, the DU notifies that the message transmitted by the CU has been normally received by transmitting a fronthaul I/F DU ADDITION REQUEST ACKNOWLEDGE message 61 to the CU.

According to an embodiment, system information of the CU may be included in the fronthaul I/F DU ADDITION REQUEST message 60 transmitted to the DU by the CU, whereas the system information of the CU may be transmitted to the DU through a separate message from the fronthaul I/F DU ADDITION REQUEST message 60. In the latter case, after transmission and reception of the two messages 60 and 61 shown in FIG. 6 is completed, the CU transmits a separate message for transmitting system information to the DU, and in response to this, the DU transmits a separate message to the CU. In addition, the system information may be defined as a separate message, as necessary.

Figure 7:
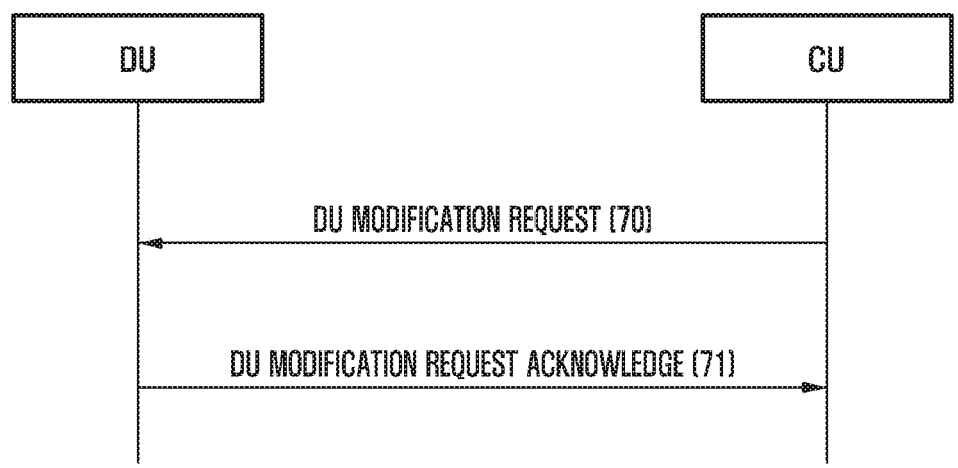
FIG. 7 is a diagram illustrating a communication process between network entities according to another embodiment.

FIG. 7 is a diagram illustrating a process of correcting/updating an RLC parameter or system information according to function split after an interface between a CU and a DU is set up. The CU transmits a fronthaul I/F DU MODIFICATION REQUEST message 70 to the DU, and information on a parameter for each layer to be modified, a function split scheme to be modified, and system information to be modified may be included in the corresponding message. In response to this, the DU transmits a fronthaul I/F DU MODIFICATION REQUEST ACKNOWLEDGE message 71 to the CU.

Figure 8:
FIG. 8 is a diagram illustrating a communication process between network entities according to another embodiment.
Figure 9:
FIG. 9 is a diagram illustrating a communication process between network entities according to another embodiment.

Following the description of the fronthaul interface-initializing procedure during the operation of the control plane, a common signaling procedure of the fronthaul interface will be described with reference to FIGS. 8 and 9.

When an RLC transparent message such as MSG3 or MSG4 is transmitted, the DU transmits a fronthaul I/F UL COMMON CONTROL TRANSFER message 80 to the CU. On the contrary, the CU transmits a fronthaul I/F DL COMMON CONTROL TRANSFER message 90 to the DU. An RRC container of the fronthaul I/F UL COMMON CONTROL TRANSFER message 80 includes the RRC message transmitted to the CU by a UE, and an RRC container of the fronthaul I/F DL COMMON CONTROL TRANSFER message 90 includes the RRC message transmitted to the UE by the CU. That is, the RRC message is included in a bearer message in the form of an RRC container and transmitted and received between the CU and the DU.

Next, the context exchange procedure during the operation of the control plane will be described with reference to FIGS. 10 to 13. The context exchange procedure may refer to a procedure in which a CU transmits information related to a UE to a DU so that the DU can support each UE, or may refer to a procedure in which a CU transmits, to a DU, context information of a UE which is not yet known to the DU.

Figure 10:
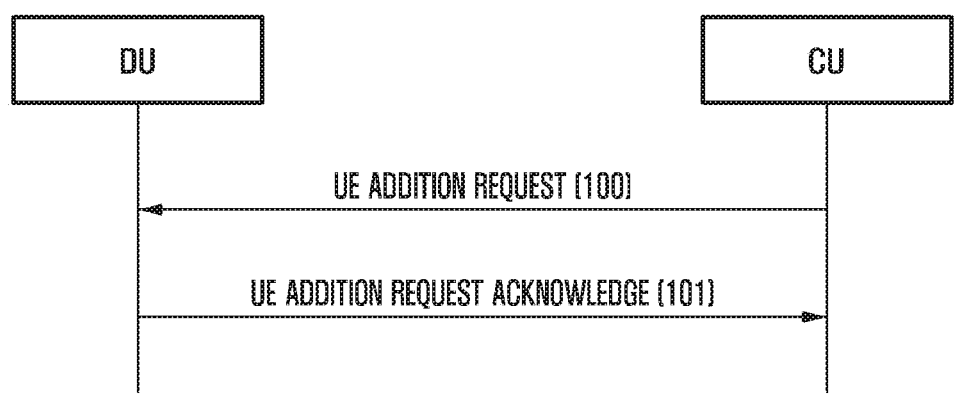
FIG. 10 is a diagram illustrating a communication process between network entities according to another embodiment.

First, in FIG. 10, after the bearer is set up according to the above-described process, the CU transmits a fronthaul I/F UE ADDITION REQUEST message 100 to the DU to transmit MAC/PHY related parameters for each UE to the DU. If the function split scheme determined between the CU and the DU identified through the above-described fronthaul interface-initializing procedure (or the operation procedure including the initializing procedure) is Option 2, an RLC parameter is not included in the fronthaul I/F UE ADDITION REQUST message 100, but if the function split scheme is determined to be Option 3-1, the RLC parameter may be included in the fronthaul I/F UE ADDITION REQUEST message 100. In response to this, the DU transmits a fronthaul I/F UE ADDITION REQUEST ACKNOWLEDGE message 101 to the CU.

According to an embodiment, the fronthaul I/F UE ADDITION REQUEST message 100 may include bearer-specific GTP endpoint information of a CU user plane in order to connect the user plane of the fronthaul interface. The GTP endpoint information refers to a tunnel endpoint identifier (TEID) and user plane address information to be received by the CU through GTP tunneling, and the GTP endpoint information is used in a process of transmitting the corresponding bearer (e.g., SRB1, SRB2, or DRBs) message from a DU to a CU. This is because, as described above, the user plane of the fronthaul interface between the DU and the CU uses a GTP protocol.

On the contrary, the fronthaul I/F UE ADDITION REQUEST ACKNOWLEDGE message 101 may include bearer-specific GTP endpoint information of a DU user plane. At this time, the GTP endpoint information is TEID and user plane address information to be received through GTP tunneling in the DU, and the GTP endpoint information is used in a process of transmitting the corresponding bearer message from the DU to the CU.

Figure 11:
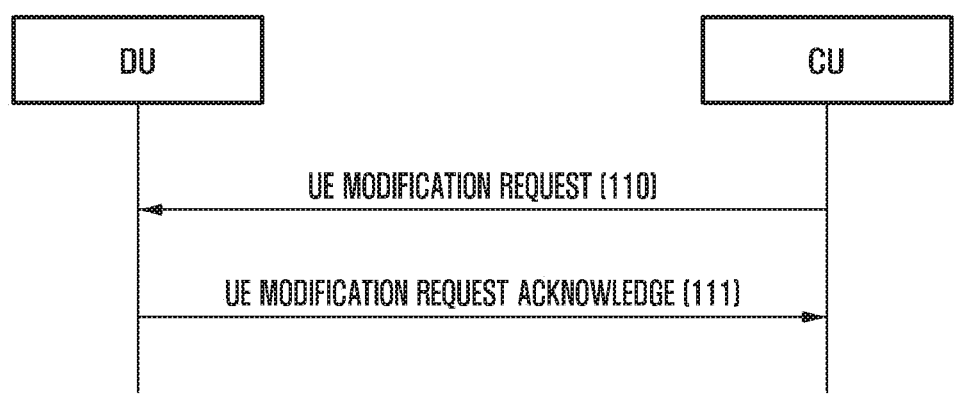
FIG. 11 is a diagram illustrating a communication process between network entities according to another embodiment.

FIG. 11 is a diagram illustrating a process of updating UE-related information between a CU and a DU. In FIG. 11, if it is necessary to update MAC/PHY information and RLC information according to the function split for each UE, the CU transmits the fronthaul I/F UE MODIFICATION REQUEST message 110 to the DU by enabling modified information to be included in the message 110. In response to this, the DU transmits the fronthaul I/F UE MODIFICATION REQUEST ACKNOWLEDGE message 111 to the CU. According to an embodiment, even when the function split scheme is changed, the CU may transmit the fronthaul I/F UE MODIFICATION REQUEST message 110 indicating the changed function split scheme to the DU.

Figure 12:
FIG. 12 is a diagram illustrating a communication process between network entities according to another embodiment.
Figure 13A:
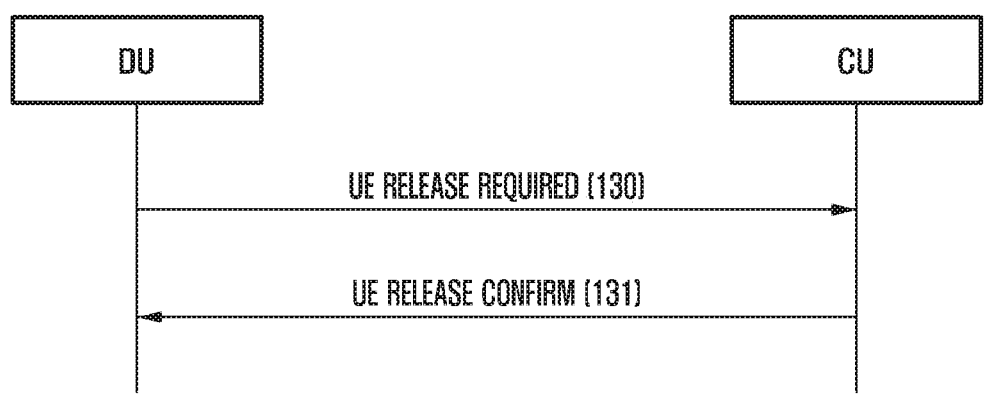
FIGS. 13A, 13B, and 13C are diagrams illustrating a communication process between network entities according to another embodiment.

In FIG. 12, the CU transmits a fronthaul I/F UE RELEASE REQUEST message 120 to the DU in order to delete UE context information when a call with a UE is released. Meanwhile, according to another embodiment, as illustrated in FIG. 13A, a process of deleting the context information of the UE may also be initiated by the DU. That is, when the DU first transmits a fronthaul I/F UE RELEASE REQUIRED message 130 to the CU to delete the UE context information, the CU may transmit a fronthaul I/F UE RELEASE CONFIRM message 131 to the DU in response to the message 130.

Figure 13B:
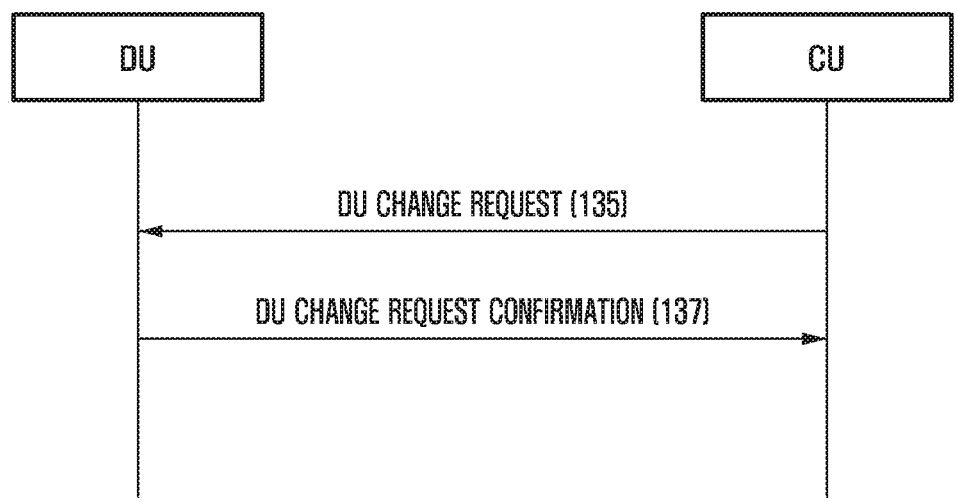

FIG. 13B illustrates an inter-DU mobility procedure between a CU and a DU according to another embodiment. The fronthaul interface context exchange procedure for transmitting UE-specific MAC/PHY information through the above-described fronthaul interface may include the inter-DU mobility procedure. Through the inter-DU mobility procedure, the CU may transmit inter-DU handover-related information for each UE by transmitting a DU change request message 135 to the DU. The inter-DU handover-related information may include a UE separator and an RRC container for supporting mobility between different DUs of the UE, and may be included in the fronthaul interface context exchange procedure as UE-related signaling. The DU receiving the DU change request message 135 may transmit a DU change request confirmation message 137 notifying the CU of an acknowledgment. Meanwhile, depending on the function split option of the DU obtained through the fronthaul interface operation procedure, when the function split option is Option 3-1, the DU change request message may include an RLC parameter, and when the function split option is Option 2, the DU change request message may not include the RLC parameter.

Figure 13C:
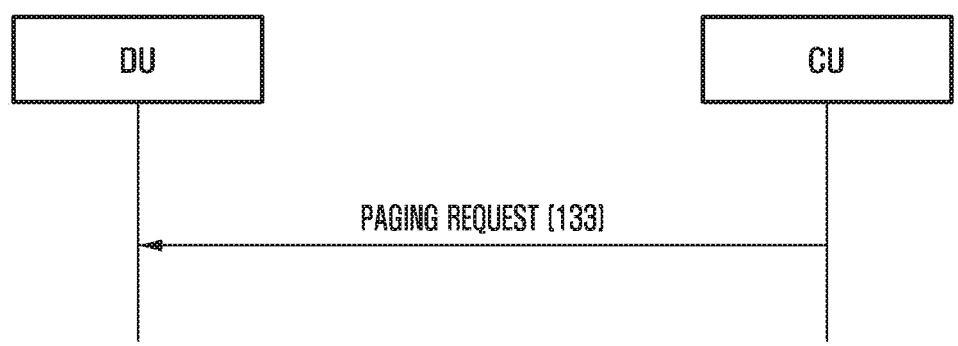

FIG. 13C is a diagram illustrating a fronthaul interface paging process between a CU and a DU according to another embodiment. In FIG. 13C, the CU transmits a paging request message 133 to the DU to transmit UE-specific paging-related information to the DU. The UE-specific paging-related information may include a UE separator and a single paging operation separator.

In the above, the control plane operation process of the fronthaul interface according to the embodiment proposed through FIGS. 4 to 13 has been described. Next, a user plane operation process of the fronthaul interface according to the embodiment proposed through FIGS. 14 to 21 will be described.

Figure 14:
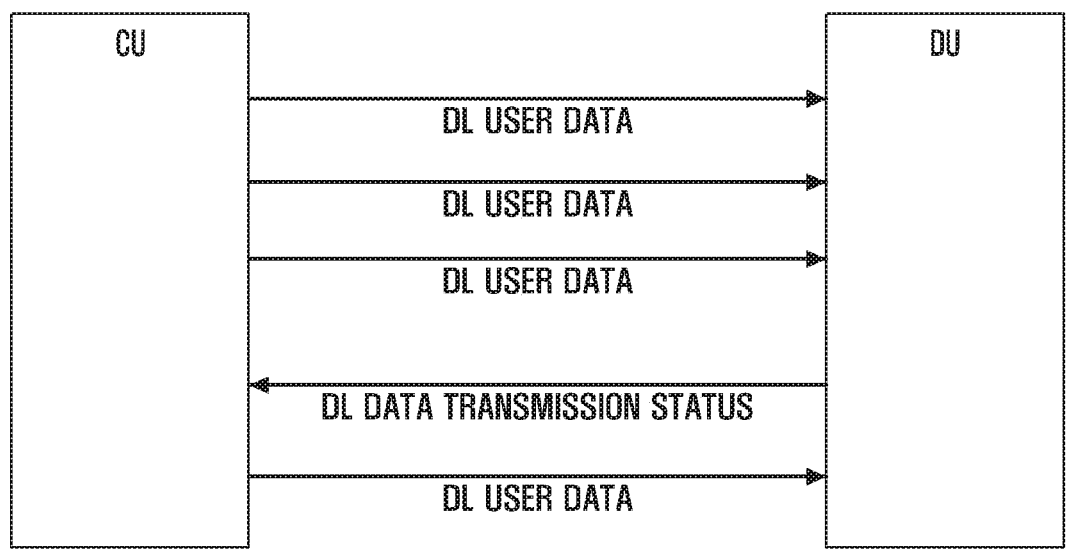
FIG. 14 is a diagram illustrating a communication process between network entities according to another embodiment.

As described above, according to the proposed embodiment, the user plane of the fronthaul interface between the CU and the DU is defined using the GTP protocol. Downlink (DL) traffic transmission from the CU to the DU is performed through transmission of DL USER DATA from the CU and transmission of DL DATA DELIVERY STATUS from the DU, as shown in FIG. 14. UL traffic from the DU to the CU is transmitted through a GTP-U tunnel using the GTP protocol without a separate header. As described above, the user plane according to an embodiment is based on the GTP-U, and defines "RAN container" as the extension header of the GTP-U so that the header of the user plane is configured. In this case, the user plane of the proposed fronthaul interface may be defined to maintain compatibility with the conventional X2 user plane.

FIGS. 15 and 16 illustrate data structures when the function split scheme is set up according to Option 2, and FIGS. 17 and 18 illustrate data structures when the function split scheme is set up according to Option 3-1. FIGS. 15 and 16 will be described first.

When the function split scheme between the CU and the DU is set up according to Option 2, DL user data may be transmitted and received according to the structure of FIG. 15 through the fronthaul interface, and DL data transmission status information may be transmitted and received according to the structure of FIG. 16. In the case of Option 2, since RRC and PDCP layers are implemented in the CU, the data structure of FIG. 15 may be a structure for a PDCP PDU, and the data structure of FIG. 16 may be a structure indicating a PDCP PDU transmission status.

First, in FIG. 15, the data structure of the DL user data is defined as "PDU type 8". According to an embodiment, the data structure of FIG. 15 includes a "required flag" field configured when an immediate response to a DL PDCP PDU is required. A bit 3 of bits 0 to 3, which are spare bits of a first octet of the DL user data structure, may be used for the "required flag" field. When the corresponding flag value is set to 1 and transmitted to the DU, the DU should inform the CU whether to receive the corresponding PDU. Except for the "required flag" field according to the embodiment proposed in FIG. 15, the remaining data structures may be defined in the same manner as the data structure of the user plane according to the existing X2 interface. In addition, when the RRC message is transmitted through a PDU type 8, the RRC message may be included in the form of the above-described RRC container and transmitted.

In FIG. 16, the data structure of the DL data transmission status is defined as "PDU type 9", and may be defined identically to the data structure defined in the LTE communication system so that it can also be used interchangeably even in the interworking with LTE. Meanwhile, when the "required flag" field described in FIG. 15 is set to 1, the DU immediately transmits a DL data transmission status message to the CU to inform the CU that the DU has normally received a message requiring an immediate response, which is transmitted by the CU. At this time, specific classification for the response is performed using an X2-U sequence number.

When the function split scheme between the CU and the DU is set up according to Option 3-1, DL user data may be transmitted and received according to the structure of FIG. 17 through the fronthaul interface and DL data transmission status information may be transmitted and received according to the structure of FIG. 18. In the case of Option 3-1, since the RRC, PDCP, and RLC layers are implemented in the CU, the data structure of FIG. 15 may be a structure for the RLC PDU, and the data structure of FIG. 16 may be a structure indicating an RLC PDU transmission status.

First, in FIG. 17, the data structure of the DL user data is defined as a "PDU type 10". According to an embodiment, similar to FIG. 15, the data structure of FIG. 17 may also include the "required flag" field configured when an immediate response to the corresponding PDU is required. According to another embodiment, the data structure of FIG. 17 may include a "priority" field for setting up the priority of RLC PDU processing. Table 1 below shows QoS priorities determined according to the types of the RLC PDUs. According to an embodiment, the RLC PDUs may be sequentially processed according to the value of the "priority" field determined according to the types of the RLC PDUs.

TABLE 1

| PDU TYPE | Priority |
| --- | --- |
| RLC STATUS PDU | 0 |
| RRC Message | 1 |
| RLC Retransmission PDU | 2 |
| Others | 3 |

According to another embodiment, the data structure of FIG. 17 may include an "RTT" field for measuring a round trip time (RTT) between a CU and a DU. When the flag value of the RTT field is set to on, the DU transmits the DL data transmission status shown in FIG. 18 to the CU by enabling a sender timestamp and the RTT information measured by the DU to be included in the DL data transmission status. In the case of the function split option 3-1, it is required to optimize the RLC parameter so as to be suitable for fronthaul latency. By defining the RTT flag, it is possible to measure a correct RTT between the CU and the DU. In addition, when the RRC message is transmitted through the PDU type 10, the RRC message may be included in the form of the RRC container described above and transmitted.

In FIG. 18, the data structure of the DL data transmission status is defined as "PDU type 11", and may be defined identically to the data structure defined in the LTE communication system so that it can also be used interchangeably even in the interworking with LTE. Meanwhile, in FIG. 18, a "credit indication flag" field is a field indicating a presence or absence of a "desired buffer size for the E-RAB" field and a "minimum desired buffer size for the UE" field. That is, when credit-based flow control is not required, the CU and DU can set the "credit indication flag" to off so that credit-related information is not included in the DL data transmission status.

The "RTT" field in FIG. 18 indicates whether RTT-related information (e.g., sender timestamp or receiver timestamp) is included in the DL data transmission status. When the RTT field value of FIG. 17 is set to on, the DU may transmit the DL data transmission status to the CU by enabling the sender timestamp included in the DL user data and a time when the DU transmits the DL data transmission status to be included in the receiver timestamp.

Since the importance of a DL PDCP data packet and a DL RLC data packet is particularly magnified in the fronthaul interface, according to an embodiment, a high priority is applied to a class of service/differentiated services code point (Cos/DSCP) of the corresponding packet so that it can be expected to increase the transmission reliability.

Figure 19:
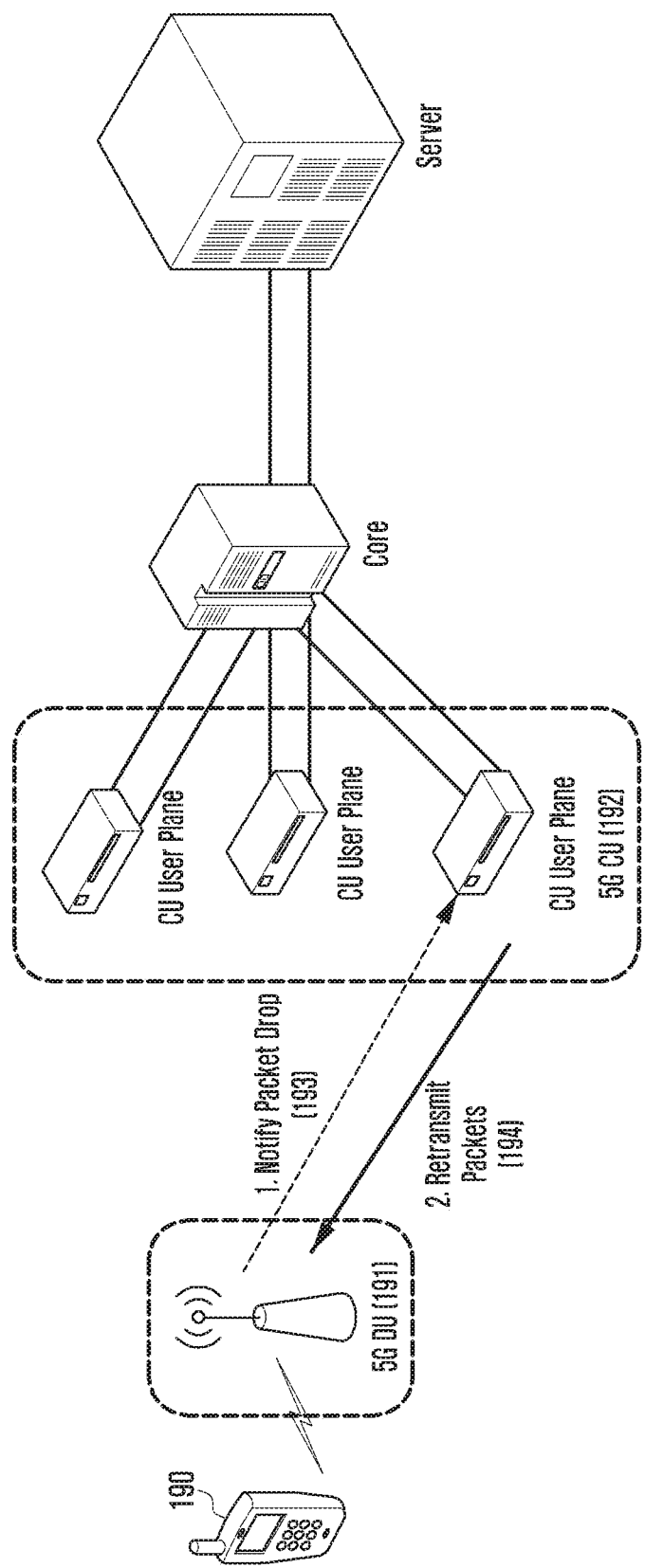
FIG. 19 is a diagram illustrating a packet loss processing process according to an embodiment.

Next, FIG. 19 illustrates a process of processing a packet loss that may occur in the fronthaul interface between the CU and the DU. For both function split Option 2 and Option 3-1, if a packet loss of the fronthaul interface occurs, retransmission from the CU to the DU is performed.

For example, in the case of an RRC message transmitted from a CU 192 to a UE 910 via a DU 191, the CU 192 sets, to on, the "required flag" field of the DL user data described with reference to FIGS. 15 and 17. Accordingly, the DU 191 enables information indicating whether the DU 191 normally receives the corresponding PDU to be included in a DL data transmission status and transmits the DL data transmission status to the CU 192.

In this case, whether a specific packet is lost is known to the CU 192 in 193. If there is a packet that needs to be retransmitted according to a response from the DU 191, the corresponding packet is retransmitted to the DU 191 in 194.

Figure 20:
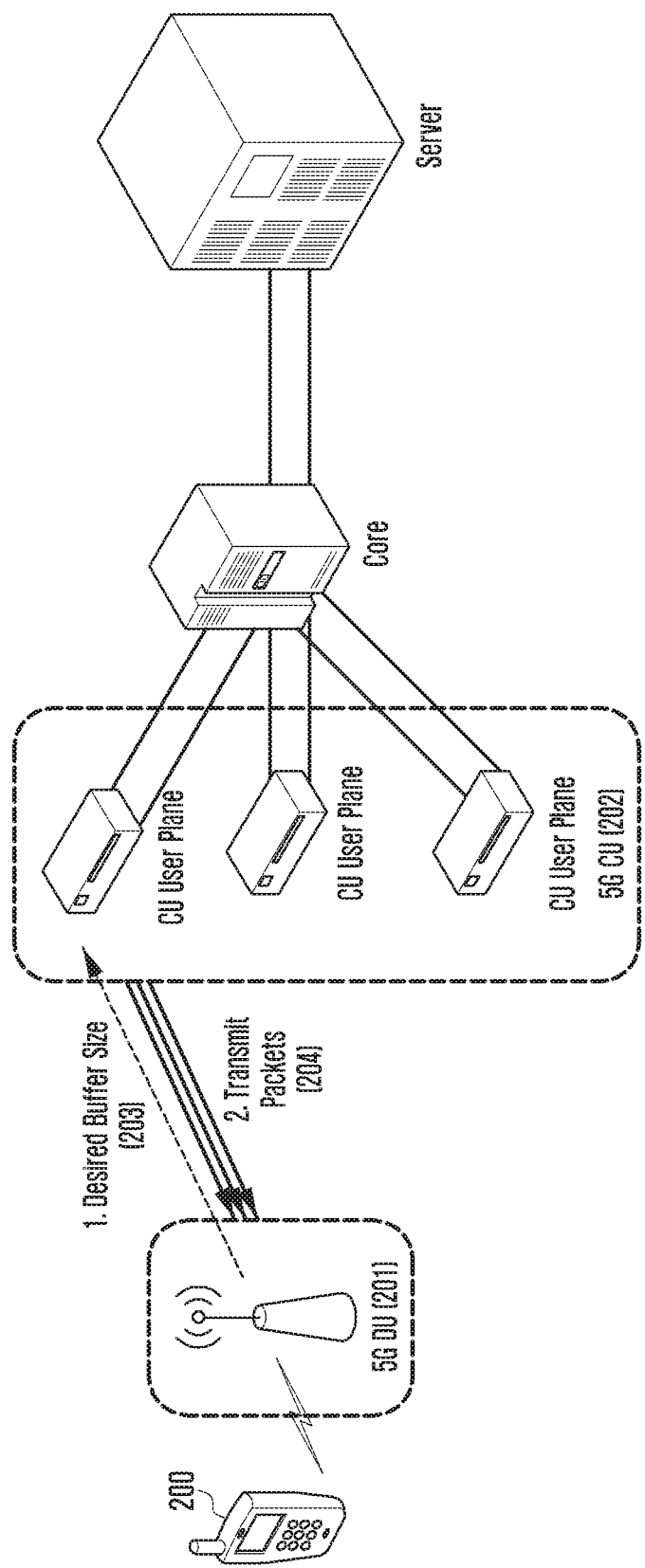
FIG. 20 is a diagram illustrating a flow control process according to an embodiment.
Figure 21:
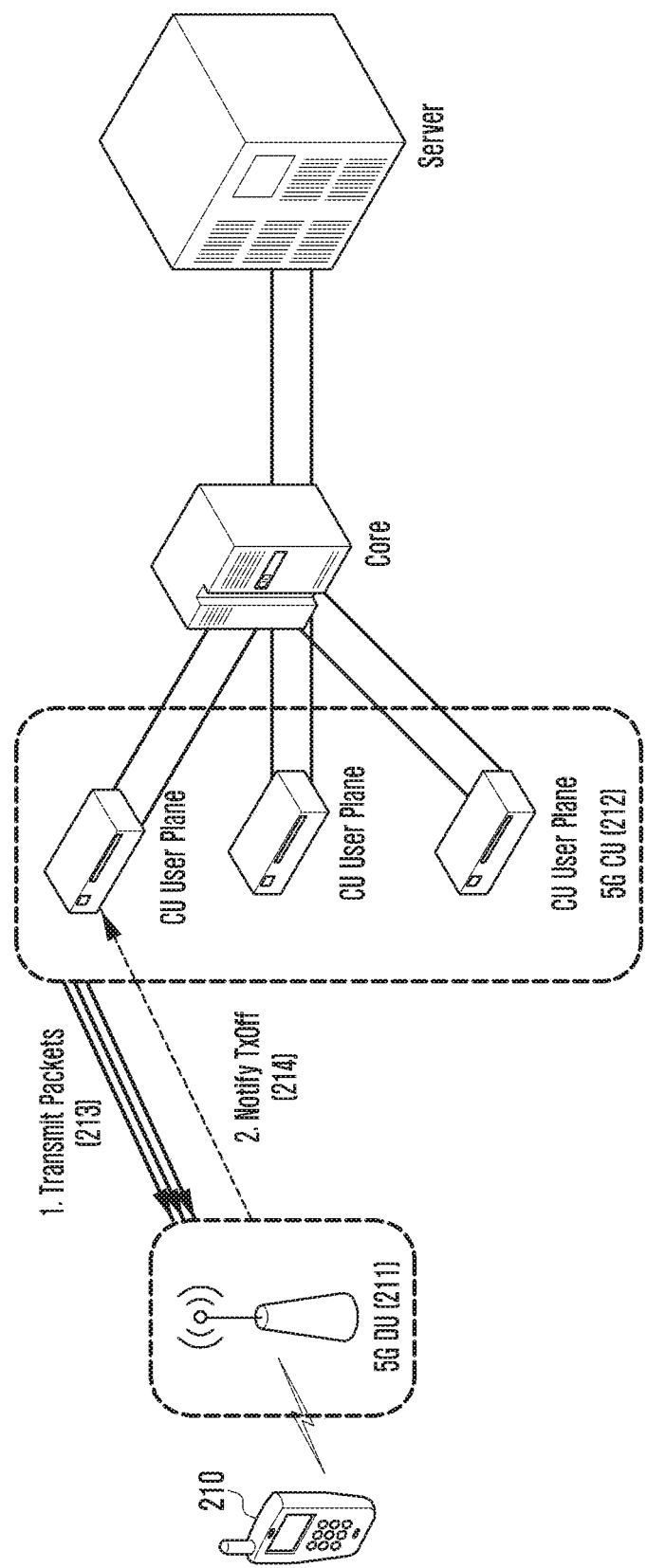
FIG. 21 is a flowchart illustrating a flow control process according to another embodiment.

FIGS. 20 and 21 illustrate a flow control process of a fronthaul interface between a CU and a DU. When congestion of a network occurs in a fronthaul section, flow control is performed by the CU/DU to prevent a packet loss. Flow control functions are classified into credit-based flow control and event-based flow control depending on the situation. FIG. 20 illustrates credit-based flow control according to an embodiment, and FIG. 21 illustrates event-based flow control according to an embodiment.

First, according to the credit-based flow control procedure of FIG. 20, a DU 201 transmits, to a CU 202, information on a size of a buffer that can be processed by the DU 201 in 203, and the CU 202 adjusts a transmission throughput based on a value representing the received information on the size of the buffer and transmits a packet to the DU 201 in 204. In function split Option 2, since it is difficult to recover a packet loss of the fronthaul interface, there is an advantage in applying the credit-based flow control as shown in FIG. 20.

Next, according to the event-based flow control procedure of FIG. 21, the DU 211 transmits a TxOff event to the CU 212 when a network congestion situation occurs in 213 while receiving the packet from the CU in 214. When the CU 212 receives the TxOff event, shaping or buffering is performed, and the DU 211 starts packet transmission again at the existing rate according to a TxOn event transmitted to the CU 212 due to the release from the congestion situation. In the function split Option 3-1, since the RLC layer supports an ARQ retransmission function between peer RLC entities, relatively loose flow control can be applied as in the event-based flow control of FIG. 21.

According to the embodiments described above, it is possible to set up the fronthaul interface between the CU and the DU even among vendors that support different function split schemes. In particular, since the function split Options 2 and 3-1 have different advantages, it may be a great advantage to support all of the function split schemes. For example, since Option 2 has an advantage of ensuring the transmission reliability of user data or the RRC message, it is possible to immediately retransmit a packet in case of a packet loss, to check the transmission and reception condition of the RRC message, and to perform retransmission. Option 3-1 has an advantage that it is possible to check the transmission status of the RLC PDU and to control the QoS by setting the priority of the RLC packet.

Therefore, according to the embodiments described above, the fronthaul interface may be set up by dynamically selecting the function split scheme according to the network environment or service requirements, thereby implementing optimized communication according to situations. According to the proposed embodiment, the function split scheme Option 2 may support the credit-based flow control and the function split scheme Option 3-1 may support the event-based flow control in the flow control, thereby performing the flow control according to the fronthaul interface situation and operation policy.

Figure 22:
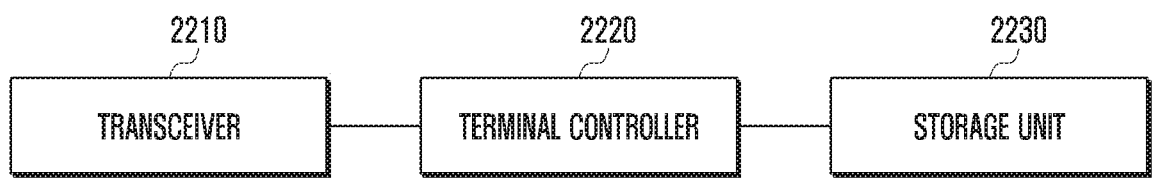
FIG. 22 is a diagram illustrating a structure of a UE according to an embodiment.

FIG. 22 is a diagram illustrating a structure of a UE according to an embodiment.

Referring to FIG. 22, a UE may include a transceiver 2210, a UE controller 2220, and a storage unit 2230. In the disclosure, the UE controller 2220 may be defined as a circuit, an application specific integrated circuit, or at least one processor.

The transceiver 2210 transmits and receives a signal to and from another network entity. The transceiver 2210 may receive system information from, for example, a network entity (e.g., a CU, a DU, and/or an eNB), and may receive a synchronization signal or a reference signal.

The UE controller 2220 may control the overall operation of the UE according to the embodiment proposed by disclosure. For example, the UE controller 2220 may control the transceiver 2210 and the storage unit 2230 to perform the operation according to the above-described embodiments. Specifically, the UE controller 2220 may control other components to transmit and receive signals to and from the CU and/or DU according to an embodiment and to perform communication.

The storage unit 2230 may store at least one of information transmitted and received through the transceiver 2210 and information generated through the UE controller 2220.

For example, the storage unit 2230 may store system information of the CU or MAC/PHY-related parameter information of the DU, which are received through the transceiver 2210.

Figure 23:
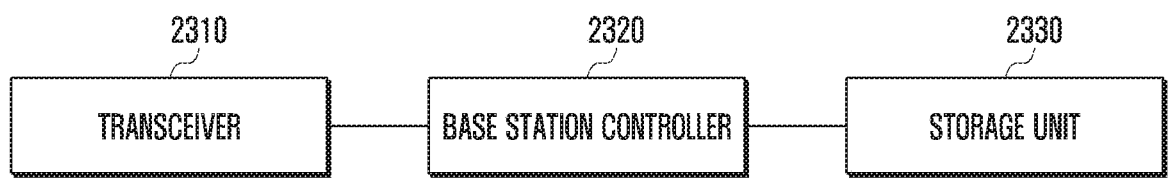
FIG. 23 is a diagram illustrating a structure of an eNB according to an embodiment.

FIG. 23 is a diagram illustrating a structure of an eNB according to an embodiment. The eNB described in FIG. 23 may mean both the CU and the DU described above. Since the CU and the DU may be implemented as separate network entities, the eNB of FIG. 23 may refer to a CU or a DU as an independent network entity.

Referring to FIG. 23, the eNB may include a transceiver 2310, an eNB controller 2320, and a storage unit 2330. In the disclosure, the eNB controller 2320 may be defined as a circuit, an application specific integrated circuit, or at least one processor.

The transceiver 2310 may transmit and receive a signal to and from another network entity. For example, the transceiver 2310 may transmit system information to a UE, and may transmit a synchronization signal or a reference signal.

The eNB controller 2320 may control the overall operation of the eNB according to an embodiment proposed by the disclosure. For example, the eNB controller 2320 may control the transceiver 2310 and the storage unit 2330 to perform an operation according to the above-described embodiments. Specifically, the eNB controller 2320 included in the CU may control operations for setting up a fronthaul interface with the DU and transmitting and receiving a message to and from the DU through the fronthaul interface. The eNB controller 2320 included in the DU may control operations for setting up the fronthaul interface with the CU and transmitting and receiving a message to and from the CU.

The storage unit 2330 may store at least one of information transmitted and received through the transceiver 2310 and information generated by the eNB controller 2320. For example, the storage unit 2330 of the CU/DU may store the function split scheme of the fronthaul interface set up between the CU and the DU and the layer-specific parameters, respectively.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out.

The invention claimed is:

1. A method performed by a distributed unit (DU) in a wireless communication system, the method comprising:
    transmitting, to a central unit (CU), a fronthaul interface setup request message including first information for setting up a fronthaul interface with the CU;
    receiving, from the CU, a fronthaul interface setup response message including second information for setting up the fronthaul interface with the DU, in response to the fronthaul interface setup request message;
    setting up the fronthaul interface with the CU based on the first information and the second information;
    receiving, from the CU, a user equipment (UE) context modification request message to modify an established UE context;
    performing a modification of the established UE context based on the UE context modification request message;
    transmitting, to the CU, a UE context modification response message in response to the UE context modification request message; and
    performing communication with the CU through a set-up fronthaul interface and communication with a UE associate with the modified UE context.

2. The method of claim 1,
    wherein the first information includes a function split scheme to be operated by the DU, and
    wherein the second information indicates whether the CU approved the function split scheme included in the first information.

3. The method of claim 1, the method further comprising:
    transmitting, to the CU, an uplink radio resource control (RRC) transfer message including an uplink RRC message; and
    receiving, from the CU, a downlink RRC transfer message including a downlink RRC message.

4. The method of claim 1,
    wherein the DU is a source DU in a handover procedure for the UE, and
    wherein the UE context modification request message includes a radio resource control (RRC) container for supporting mobility, the RRC container indicating to stop data transmission for the UE.

5. A distributed unit (DU) in a wireless communication system, the DU comprising;
    a transceiver configured to transmit and receive a signal; and
    a controller configured to:
        transmit, to a central unit (CU), a fronthaul interface setup request message including first information for setting up a fronthaul interface with the CU,
        receive, from the CU, a fronthaul interface setup response message including second information for setting up the fronthaul interface with the DU, in response to the fronthaul interface setup request message,
        set up the fronthaul interface with the CU based on the first information and the second information,
        receive, from the CU, a user equipment (UE) context modification request message to modify an established UE context,
        perform a modification of the established UE context based on the UE context modification request message,
        transmit, to the CU, a UE context modification response message in response to the UE context modification request message, and
        perform communication with the CU through a set-up fronthaul interface and communication with a UE associate with the modified UE context.

6. The DU of claim 5,
    wherein the first information includes a function split schemes to be operated by the DU, and
    wherein the second information indicates whether the CU approved the function split scheme included in the first information.

7. The DU of claim 5, wherein the controller is further configured to:
    transmit, to the CU, an uplink radio resource control (RRC) transfer message including an uplink RRC message, and
    receive, from the CU, a downlink RRC transfer message including a downlink RRC message.

8. The DU of claim 5,
wherein the DU is a source DU in a handover procedure for the UE, and
wherein the UE context modification request message includes a radio resource control (RRC) container for supporting mobility, the RRC container indicating to stop data transmission for the UE.

9. A method performed by a central unit (CU) in a wireless communication system, the method comprising:
receiving, from a distributed unit (DU), a fronthaul interface setup request message including first information for setting up a fronthaul interface with the CU; transmitting, to the DU, a fronthaul interface setup response message including second information for setting up the fronthaul interface with the DU, in response to the fronthaul interface setup request message;
setting up the fronthaul interface with the DU based on the first information and the second information;
transmitting, to the DU, a user equipment (UE) context modification request message to modify an established UE context;
receiving, from the DU, a UE context modification response message in response to the UE context modification request message; and
performing communication with the CU through a set-up -fronthaul interface and communication with a UE associate with the modified UE context via the DU.

10. The method of claim 9,
wherein the first information includes function split schemes to be operated by the DU, and
wherein the second information indicates whether the CU approved the function split scheme included in the first information.

11. The method of claim 9, the method further comprising:
receiving, from the DU, an uplink radio resource control (RRC) transfer message including an uplink RRC message; and
transmitting, to the DU, a downlink RRC transfer message including a downlink RRC message.

12. The method of claim 9,
wherein the DU is a source DU in a handover procedure for the UE, and
wherein the UE context modification request message includes a radio resource control (RRC) container for supporting mobility, the RRC container indicating to stop data transmission for the UE.

13. A central unit (CU) in a wireless communication system, the CU comprising:
a transceiver configured to transmit and receive a signal; and
a controller configured to:
receive, from a distributed unit (DU), a fronthaul interface setup request message including first information for setting up a fronthaul interface with the CU,
transmit, to the DU, a fronthaul interface setup response message including second information for setting up the fronthaul interface with the DU, in response to the fronthaul interface setup request message,
set up the fronthaul interface with the DU based on the first information and the second information,
transmit, to the DU, a user equipment (UE) context modification request message to modify an established UE context,
receive, from the DU, a UE context modification response message in response to the UE context modification request message, and
perform communication with the CU through a set-up fronthaul interface and communication with a UE associate with the modified UE context via the DU.

14. The CU of claim 13,
wherein the first information includes function split schemes to be operated by the DU, and
wherein the second information indicates whether the CU approved the function split scheme included in the first information.

15. The CU of claim 13, wherein the controller is further configured to:
receive, from the DU, an uplink radio resource control (RRC) transfer message including an uplink RRC message, and
transmit, to the DU, a downlink RRC transfer message including a downlink RRC message.

16. The CU of claim 13,
wherein the DU is a source DU in a handover procedure for the UE, and
wherein the UE context modification request message includes a radio resource control (RRC) container for supporting mobility, the RRC container indicating to stop data transmission for the UE.

* * * * *